(12) United States Patent
Krause

(10) Patent No.: US 11,221,090 B2
(45) Date of Patent: Jan. 11, 2022

(54) CONDUIT STUB-UP ELIMINATOR ASSEMBLY

(71) Applicant: CSUE Technologies, Inc., Niles, IL (US)

(72) Inventor: Jeffrey Krause, Niles, IL (US)

(73) Assignee: CSUE TECHNOLOGIES, INC., Niles, IL (US)

( * ) Notice: Subject to any disclaimer, the term of this patent is extended or adjusted under 35 U.S.C. 154(b) by 0 days.

(21) Appl. No.: 16/749,248

(22) Filed: Jan. 22, 2020

(65) Prior Publication Data
US 2020/0256482 A1     Aug. 13, 2020

Related U.S. Application Data

(60) Provisional application No. 62/803,035, filed on Feb. 8, 2019.

(51) Int. Cl.
*F16L 1/024*     (2006.01)
*F16L 43/02*     (2006.01)

(52) U.S. Cl.
CPC ............. *F16L 1/0246* (2013.01); *F16L 43/02* (2013.01)

(58) Field of Classification Search
CPC .......... F16L 1/0246; F16L 43/02; H02G 3/04; H02G 9/06; F16B 21/06; F16B 21/09
See application file for complete search history.

(56) References Cited

U.S. PATENT DOCUMENTS

| | | | |
|---|---|---|---|
| 2004/0104498 A1* | 6/2004 | Schneider | B28B 23/0068 264/31 |
| 2008/0012338 A1* | 1/2008 | Wiese | H02G 3/38 285/417 |
| 2010/0213326 A1* | 8/2010 | Julian | E03C 1/021 248/72 |
| 2016/0190783 A1* | 6/2016 | Krause | F16L 29/00 285/150.1 |
| 2018/0110153 A1* | 4/2018 | Hennrich | E05D 15/502 |
| 2020/0355301 A1* | 11/2020 | Ball | F16L 3/18 |

FOREIGN PATENT DOCUMENTS

| | | | | |
|---|---|---|---|---|
| DE | 9013433 U1 | * | 12/1990 | ............... F16L 3/10 |
| EP | 2910829 B1 | * | 8/2015 | ............... F16L 3/10 |

* cited by examiner

*Primary Examiner* — Benjamin F Fiorello
(74) *Attorney, Agent, or Firm* — Wood, Phillips, Katz, Clark & Mortimer

(57) ABSTRACT

A conduit stub-up eliminator assembly as disclosed herein comprises an elbow including a first connector end for securing to a horizontal in-slab raceway, in use, and a second connector end having a threaded collar with an opening for selectively receiving a vertical above slab raceway, in use. A stub extends radially outward proximate the collar. A supporting device comprises an elongate rail having a plurality of spaced openings sized to receive the stub and having a length corresponding to the select thickness. A turned in base is for attachment to formwork prior to pouring of concrete to form the concrete slab. The pipe fitting stub is received in a select one of the rail openings so that the collar opening is spaced from the base a distance corresponding to the select thickness so that the collar opening is flush with the surface of the concrete slab.

20 Claims, 6 Drawing Sheets

CONDUIT STUB-UP ELIMINATOR ASSEMBLY

FIELD OF THE INVENTION

The present disclosure generally relates to electrical conduit connections, and more particularly pertains to assemblies and methods suitable for in-slab conduit connections.

BACKGROUND

In slab-on-grade, suspended slab concrete structures and slab-on-metal deck construction it is often a standard practice to install electrical conduit raceways within the body of the concrete slab. In order to be able to continue the conduit raceway vertically after concrete placement, the conduit is left extending, for example, approximately six to twelve inches above the top of the slab, to allow the in-slab conduit to be coupled to the future extension of the raceway. This section of conduit extending above the final slab elevation is commonly referred to as a "conduit stub-up". The conduit stub-up may enable the use of conventional conduit couplings, such as a set-screw fitting, which may sleeve over the two pieces of conduit being joined together.

Because the conventional conduit stub-up extends above the top surface of the concrete slab, some form of protection may often be provided around conduit stub-ups to reduce the likelihood of damage to the conduit as well as injury to unaware and/or unsuspecting workers or lay people. For example, damage to the conduit may make it difficult and expensive, perhaps prohibitively so, to couple the in-slab conduit to an additional section of conduit above the slab. In addition to possible damage to the conduit itself, the conduit stub-ups extending above the concrete slab may pose a tripping, impalement, or other safety hazard. For these reasons, various approaches may be utilized to identify and/or protect the protruding conduit stub-up (and/or to protect individuals from safety hazards associated with the conduit stub-up). Examples of attempted safety measures may include spraying the conduit stub-ups and supporting structure with safety orange paint, attaching flags to the conduit stub-ups, covering the conduit stub-ups with miscellaneous objects such as CMU blocks and painting the objects a safety orange, and, in situations where groupings of conduit stub-ups occur in-line with each other, wood blocking may be strapped to stub-ups in order to protect them from damage and sprayed with orange safety paint to make them more visible.

This application is directed to improvements in providing in-slab conduit connections while eliminating conduit stub-ups.

SUMMARY

There is disclosed herein a conduit stub-up eliminator assembly which provides a raceway connection flush with a surface of a concrete slab of a select thickness.

Broadly, there is disclosed herein a conduit stub-up eliminator assembly comprising a pipe fitting comprising a tubular element including a first connector end for securing to an in-slab raceway, in use, and a second connector end having a collar with an opening for selectively receiving an above slab raceway, in use, and a stub extending radially outward proximate the collar. A supporting device comprises an elongate rail having an opening sized to receive the stub and having a length corresponding to the select thickness. A turned in base is provided for attachment to formwork prior to pouring of concrete to form the concrete slab. The pipe fitting stub is received in the rail opening so that the collar opening is spaced from the base a distance corresponding to the select thickness so that the collar opening is flush with the surface of the resulting concrete slab.

It is a feature that the pipe fitting comprises an elbow and advantageously a short radius elbow.

It is another feature that the elongate rail has a U-shaped cross section to define a channel with a plurality of spaced openings in a base of the channel and front opening notches and side walls of the rail aligned with the openings. The pipe fitting may comprise a rearwardly extending block having a stub and sideward extending stabilizers. The block is of a size to be received in the channel with the stub in a select one of the openings and the stabilizer is received in the notches aligned with the select opening.

It is another feature that the collar comprises an inner thread for receiving a threaded connector.

It is a further feature that the assembly comprises a cap threadably received in the collar to prevent concrete from entering the pipe fitting. The cap may comprise a mushroom head with finger receptacles on opposite sides. The cap may include a pair of elongate walls extending downward from an underside of the cap for engagement by a tool head after breaking the top wall between the aligned walls.

It is yet another feature that the rail includes a plurality of frangible lines proximate associated ones of the opening to selectively break off the rail so that the rail is no longer than the select thickness.

There is disclosed in accordance with another aspect a conduit stub-up eliminator assembly comprising an elbow including a first connector end for securing to a horizontal in-slab raceway, in use, and a second connector end having a threaded collar with an opening for selectively receiving a vertical above slab raceway, in use. A stub extends radially outward proximate the collar. A supporting device comprises an elongate rail having a plurality of spaced openings sized to receive the stub and having a length corresponding to the select thickness. A turned in base is for attachment to formwork prior to pouring of concrete to form the concrete slab. The pipe fitting stub is received in a select one of the rail openings so that the collar opening is spaced from the base a distance corresponding to the select thickness so that the collar opening is flush with the surface of the concrete slab.

It is a feature of the invention that the elbow comprises a PVC elbow.

Other features and advantages will be apparent from a review of the entire specification, including the appended claims and drawings.

DETAILED DESCRIPTION

Figure 1:
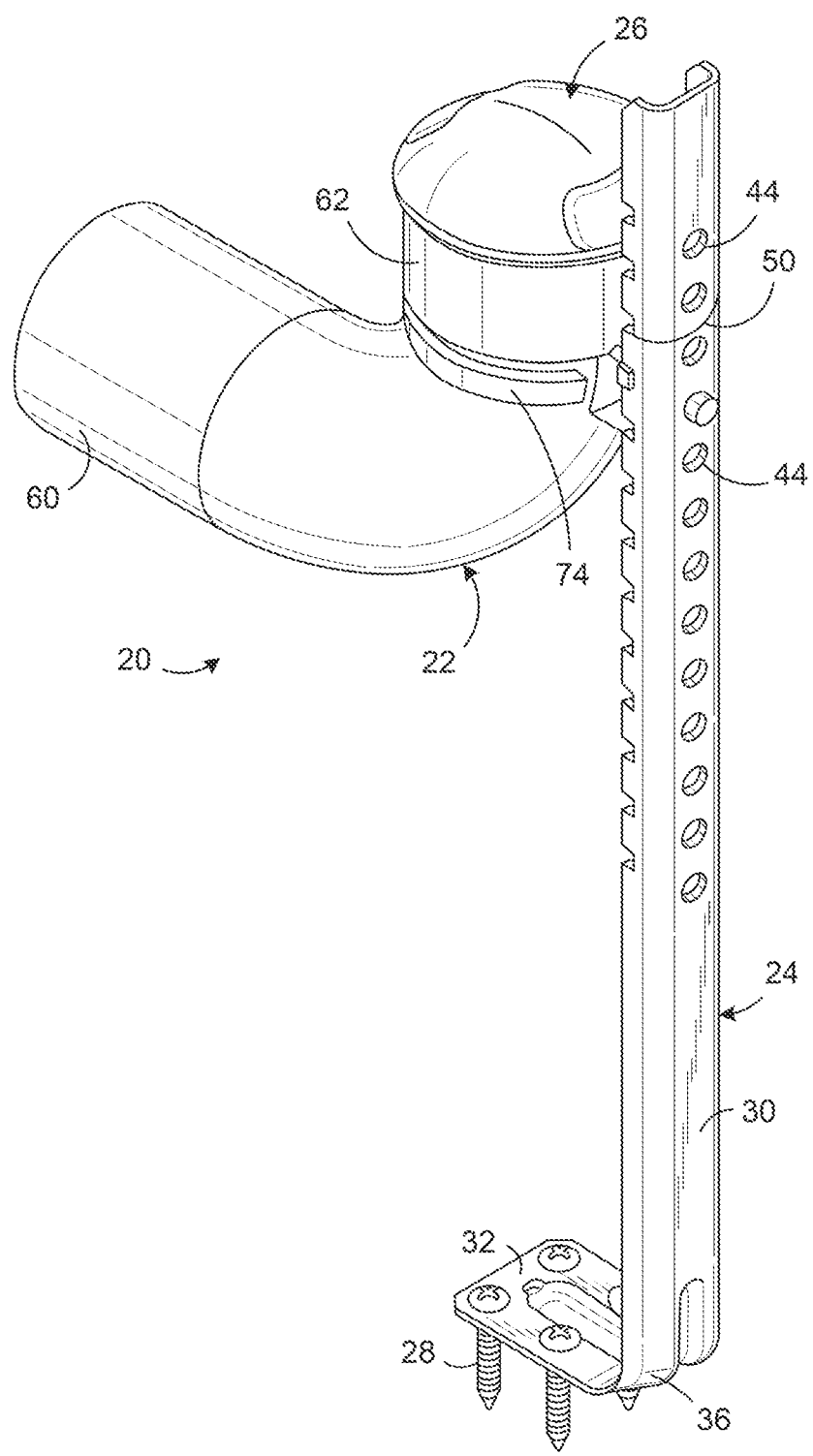
FIG. 1 is a perspective view of a conduit stub-up eliminator assembly in accordance with a first embodiment of the invention.

The potential problems and hazards associated with conduit or raceway stub-ups protruding above a concrete slab, or other surface, may be at least partially, and/or completely alleviated by eliminating and/or reducing the conduit stub-up. In some embodiments, eliminating and/or reducing the conduit stub-up may be accomplished while allowing two sections of conduit (e.g., a section of conduit disposed at least partially below the finish elevation of the concrete slab and a section of conduit to extend upwardly out from the concrete slab) to be joined or coupled together at least partially within the body of the concrete slab. In some embodiments, the coupling of the two conduit/raceway sections may be accomplished after the placement of the concrete and, in some situations, the two conduit sections may be coupled no sooner than a time when the vertical raceway element can be completely obstructed by partitions.

As shown in the accompanying drawings, a connector may be attached to a section of conduit that will be below the final grade of a concrete slab. Attaching the connector to the section of conduit may include attaching the connector to a run of conduit that has a 90 degree bend in it (e.g., so that the end of the 90 degree bend may be pointing generally vertically upward), or may include providing the connector on a short piece of conduit that has a 90 degree bend in it, which can be attached to a horizontal run of conduit that will be buried, or embedded, in the slab once the slab is poured. According to either such situation, or other similarly suitable configurations, a generally vertically oriented connector may be provided (although in other embodiments, the connector could be horizontally oriented or oriented at an angle, if that is the desired direction of the run of conduit that will be added after the slab is poured).

Without anything sticking up from the slab (before the next piece of conduit is attached) tripping, falling and/or impalement hazards might be reduced eliminated, while still allowing further pieces of conduit to be attached to provide continuous conduit runs that go into the slab.

In general, implementations of the present disclosure provide conduit stub-up arrangements that allow in-slab conduit raceway sections to be coupled with conduit raceway sections extending above the slab. In some implementations, the conduit stub-up arrangements may reduce, or eliminate, any features extending above the surface of the concrete slab prior to the point in time at which the above-slab conduit sections are coupled with the in-slab conduit sections. By reducing, or eliminating features extending above the top surface of the concrete slab, the potential for damage to the conduit raceway (also referred to herein as "conduit"), which could make it difficult and/or expensive to join the damaged conduit raceway to additional conduit raceway section, may also be reduced and/or eliminated. As such, in some embodiments, the potential time and/or expense associated with repairing damaged conduit stub-ups may be reduced and/or eliminated. Similarly, by reducing, or eliminating, features extending above the top surface of the concrete slab, the potential tripping, impalement, or other safety hazards may also be reduced and/or eliminated.

As shown in the accompanying drawings, an elbow (e.g., so that the end of the 90-degree elbow may be pointing generally vertically upward), may be attached to a horizontal section of conduit that will be below the final grade of a concrete slab. A generally vertically oriented connector may be provided (although in other embodiments, the connector could be horizontally oriented or oriented at an angle, if that is the desired direction of the run of conduit that will be added after the slab is poured).

After the concrete slab is poured and hardens, a cap can be removed from the connector (e.g., by twisting the cap out of the connector to leave a hole in the concrete slab and exposing the conduit connector buried in the slab). A piece of conduit can be secured to the connector to create a continuous conduit run extending from the buried piece of conduit and the buried conduit connector.

Without anything sticking up from the slab (before the next piece of conduit is attached) tripping, falling and/or impalement hazards might be reduced or eliminated, while still allowing further pieces of conduit to be attached to provide continuous conduit runs that go into the slab.

In general, implementations of the disclosed conduit stub-up eliminator assembly provide arrangements that allow in-slab conduit raceway sections to be coupled with conduit raceway sections extending above the slab. In some implementations, the conduit stub-up arrangements may reduce, or eliminate, any features extending above the surface of the concrete slab prior to the point in time at which the above-slab conduit sections are coupled with the in-slab conduit sections. By reducing, or eliminating, features extending above the top surface of the concrete slab, the potential for damage to the conduit raceway (also referred to herein as "conduit"), which could make it difficult and/or expensive to join the damaged conduit raceway to additional conduit raceway section, may also be reduced and/or eliminated. As such, in some embodiments, the potential time and/or expense associated with repairing damaged conduit stub-ups may be reduced and/or eliminated. Similarly, by reducing, or eliminating, features extending above the top surface of the concrete slab, the potential tripping, impalement, or other safety hazards may also be reduced and/or eliminated.

My co-pending application Ser. No. 15/411,295, the specification of which is incorporated by reference herein, illustrates several embodiments of a conduit stub-up assembly using a form that extends upwardly from an in-slab connector. For some installations there is a desire to eliminate any stub-up extending upwardly from a top of a slab. In accordance with the invention, a stub-up eliminator assembly is provided which uses an elbow providing an opening flush with the poured concrete slab and including a removable cap. The pipe/conduit fitting described herein consists of an elbow for connection to a horizontal raceway. However, the fitting could be a different configuration, such as, for example, a straight fitting for connection to a vertical raceway or a raceway including an integral elbow having a vertical outlet depending on thickness of the slab.

Figure 2:
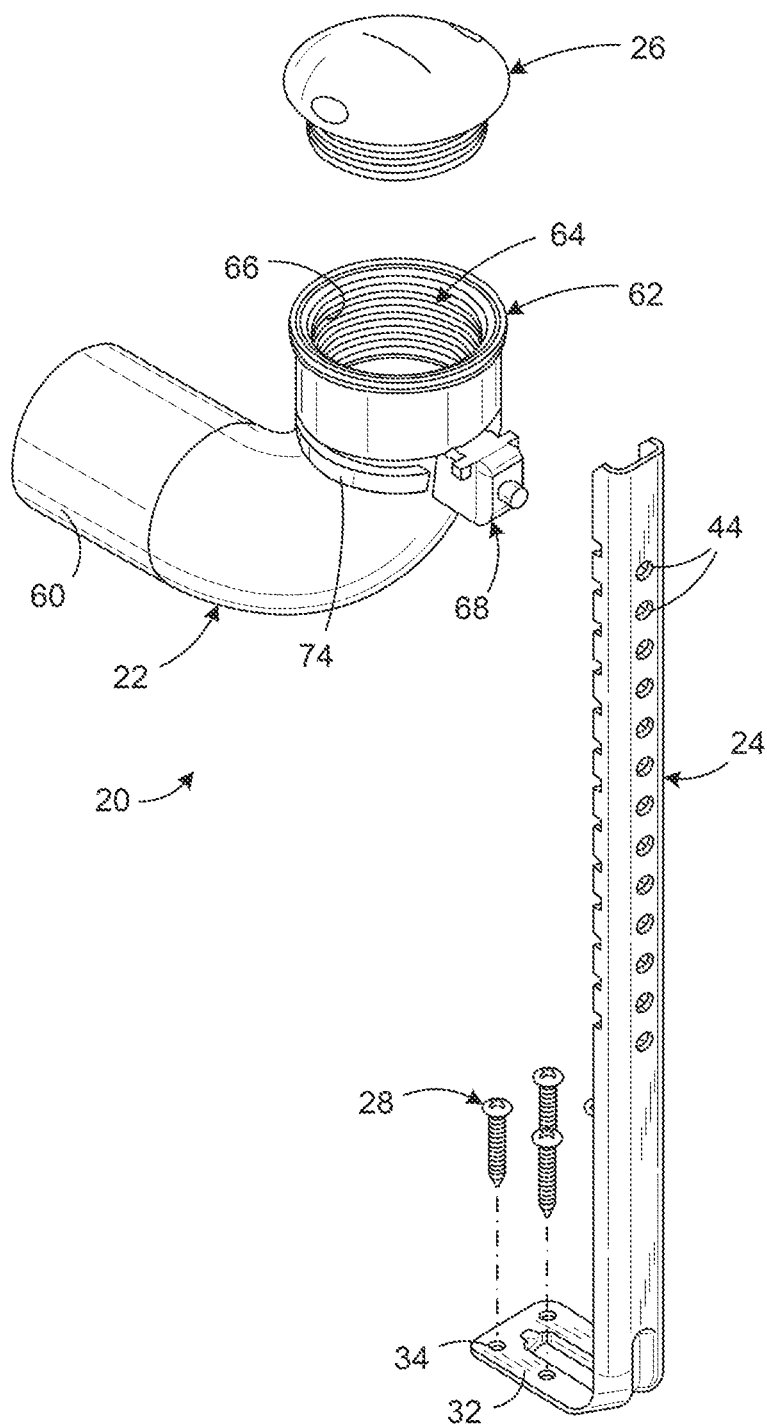
FIG. 2 is an exploded perspective view of the conduit stub-up eliminator assembly of FIG. 1.

Referring initially to FIGS. 1 and 2, a stub-up eliminator assembly 20 comprises a pipe fitting in the form of an elbow 22, a supporting device 24, referred to hereinafter as a standee, a cap 26 and screws 28. The standee 24 is adapted to be attached to formwork, such as a plywood deck or the like, in building construction prior to pouring of concrete to form a concrete slab. The standee 24 is configured to support the elbow 22 at a select vertical position so that a top opening of the elbow 22 is flush with the surface of the resulting concrete slab. The cap 26 is mounted in the elbow 22 prior to pouring of the concrete to prevent concrete from entering the raceway.

Figure 3:
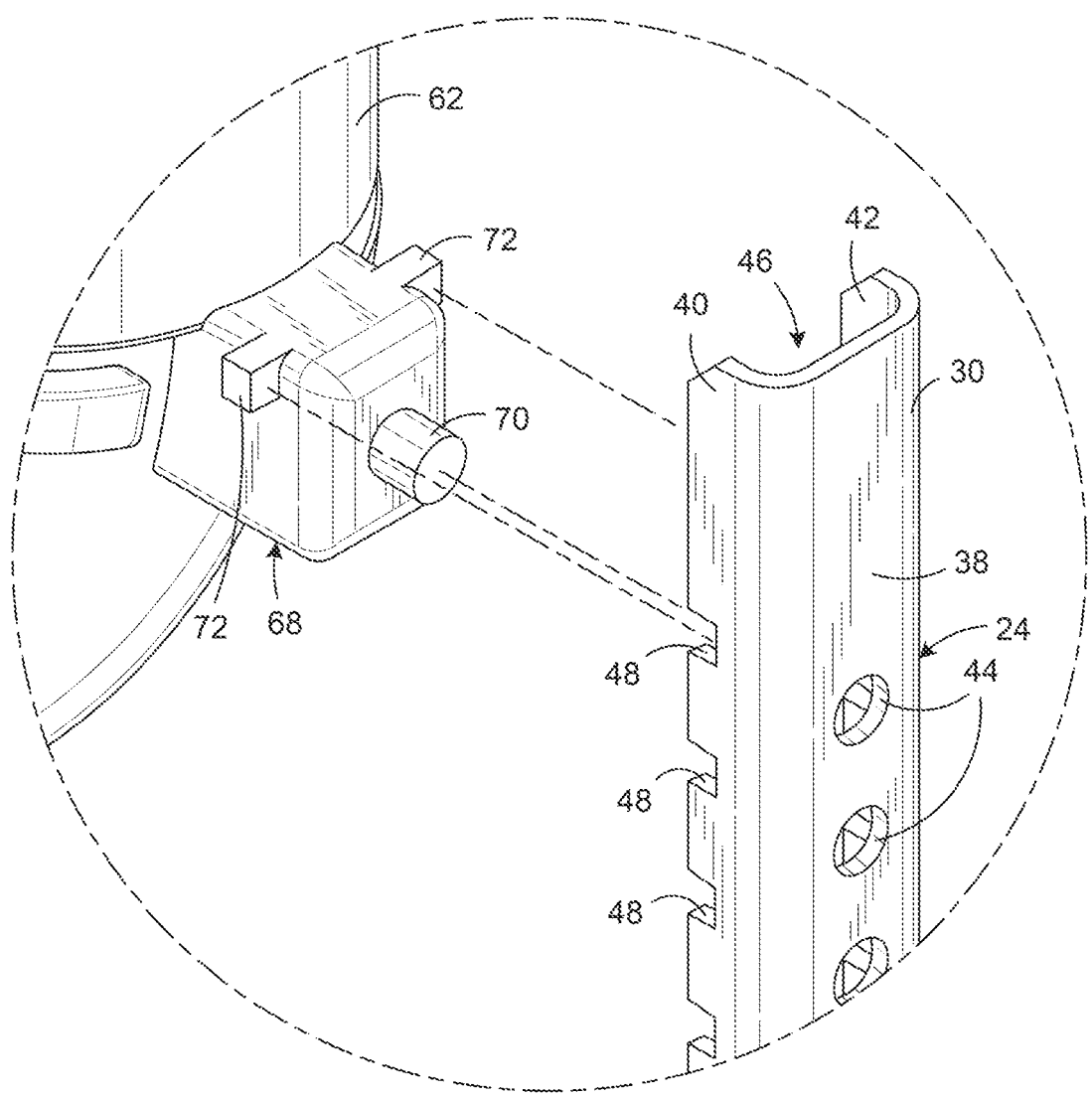
FIG. 3 is a detailed exploded view illustrating mounting of an elbow to a standee of the conduit stub-up eliminator assembly of FIG. 2.

Referring to the detailed view of FIG. 3, the standee 24 comprises an elongate rail 30, U-shaped in cross section, having a turned in base 32 at a lower end with apertures 34 for receiving the screws 28. Particularly, the rail has a 90° bend at a lower corner 36. As is apparent, other angles could be provided if a different angle is necessary. The elongate rail 30 has a base 38 connecting opposite side walls 40 and 42. A plurality of openings 44 are provided in the base 38 and may be spaced at ½ increments. The U-shaped cross section defines a channel 46 bound by the side walls 40 and 42 and the base 38. A plurality of front opening notches 48 are provided in each of the opposite side walls 40 and 42. Spacing between notches 48 is similar to spacing between the openings 44. Each pair of opposite notches 48 are associated with one of the openings 44 for mounting the elbow 22, as discussed below.

The rail 30 has a length dependent on the thickness of the concrete slab. A standard deck is eight inches so that a typical standee 24 may have a rail 30 of eight inches in length. Other lengths, such as, for example, twelve inches, can be used for decks more than eight inches in thickness. Additionally, score lines 50, see FIG. 1, which could be frangible, may be provided between each pair of openings 44 so that the standee 24 can be broken off or cut to a suitable length.

The standee 24 may be formed of metal or other material suitable to support the elbow 22 while pouring the concrete.

In the embodiment of FIGS. 1-3, the pipe fitting 22 comprises a 1½-inch PVC elbow. As will be appreciated, the pipe fitting 22 could be of other angles, or even straight, and could be of other materials, such as metallic tubing.

Figure 12:
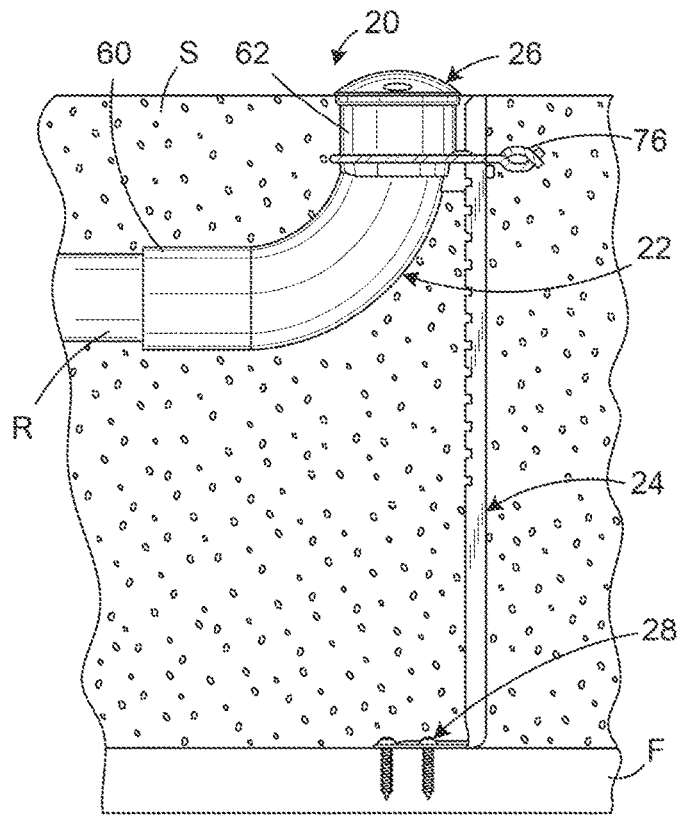
FIG. 12 is a view similar to FIG. 4 showing the conduit stub-up eliminator assembly in use after pouring of a concrete slab.

The elbow 22 comprises a lower collar 60 defining a first connector end for securing to an in-slab raceway, such as the raceway R of FIG. 12. The first collar 60 comprises a slip fitting for receiving a horizontal raceway to be appropriately secured therein in any known manner. A second connector end has an upper collar 62 with an opening 64 for selectively receiving an above slab raceway, in use. The second collar 62 has a threaded inner wall 66 for receiving a threaded connector. As will be appreciated, the invention is not limited to an elbow having a slip fitting and a threaded fitting. Other combinations or configurations could be used, as required.

The pipe fitting 22 comprises a rearwardly extending block 68 just below the upper collar 62. The block 68 is rearwardly extending in that it extends opposite the turn of the elbow. The block 68 supports a rearwardly extending stub 70. The stub 70 is cylindrical and is sized to be received in the standee openings 44. As will be apparent, other shapes could be used. The block 68 has a width corresponding to width of the channel 46. Sideward extending stabilizers 72 extend transversely from the block 68, relative to the axis of the stub 70. The stabilizers 72 are of a size and positioned to be received in opposite notches 48 of the standee 24 incident to the block 68 being received in the channel 46 and the stub 70 being received in an associated opening 44. Thus, the vertical spacing between the stabilizer 72 and the stub 70 corresponds to relative vertical spacing between the standee notches 48 and openings 44.

Figure 4:
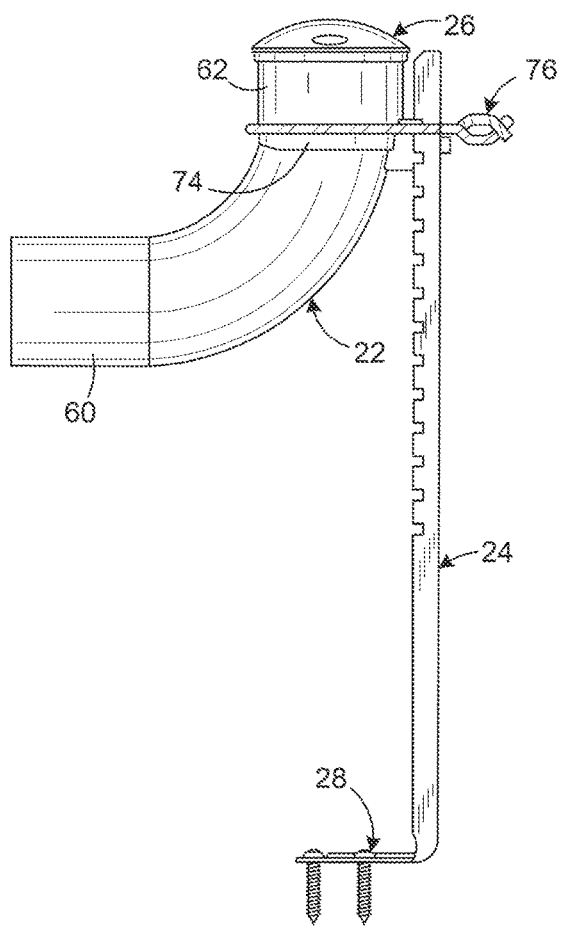
FIG. 4 is a side elevation view of the conduit stub-up eliminator assembly of FIG. 1 with a wire tie.
Figure 5:
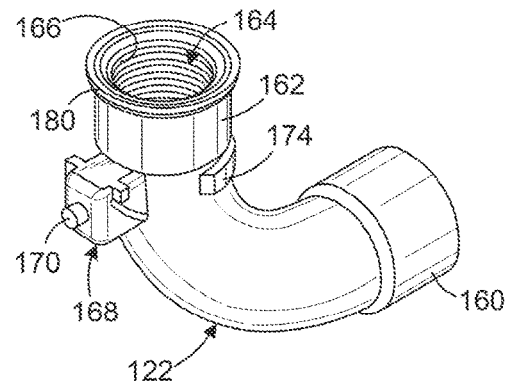
FIG. 5 is a perspective view of an elbow in accordance with a second embodiment of the invention used with the conduit stub-up eliminator assembly of FIG. 1.
Figure 8:
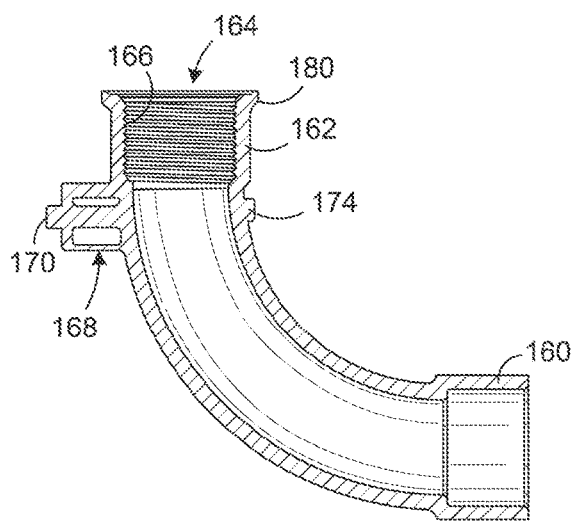
FIG. 8 is a sectional view taken along the line 8-8 of FIG. 7.
Figure 7:
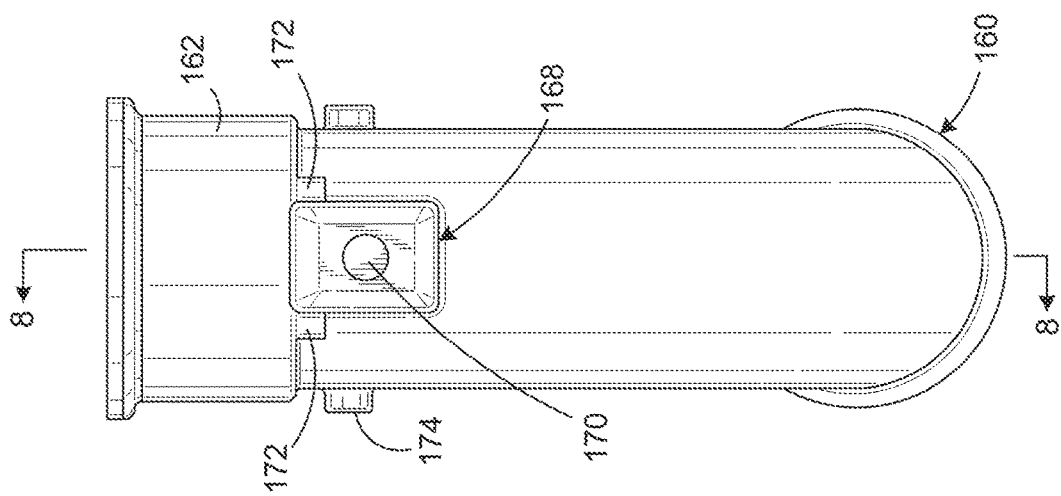
FIG. 7 is a rear elevation view of the elbow of FIG. 5.
Figure 6:
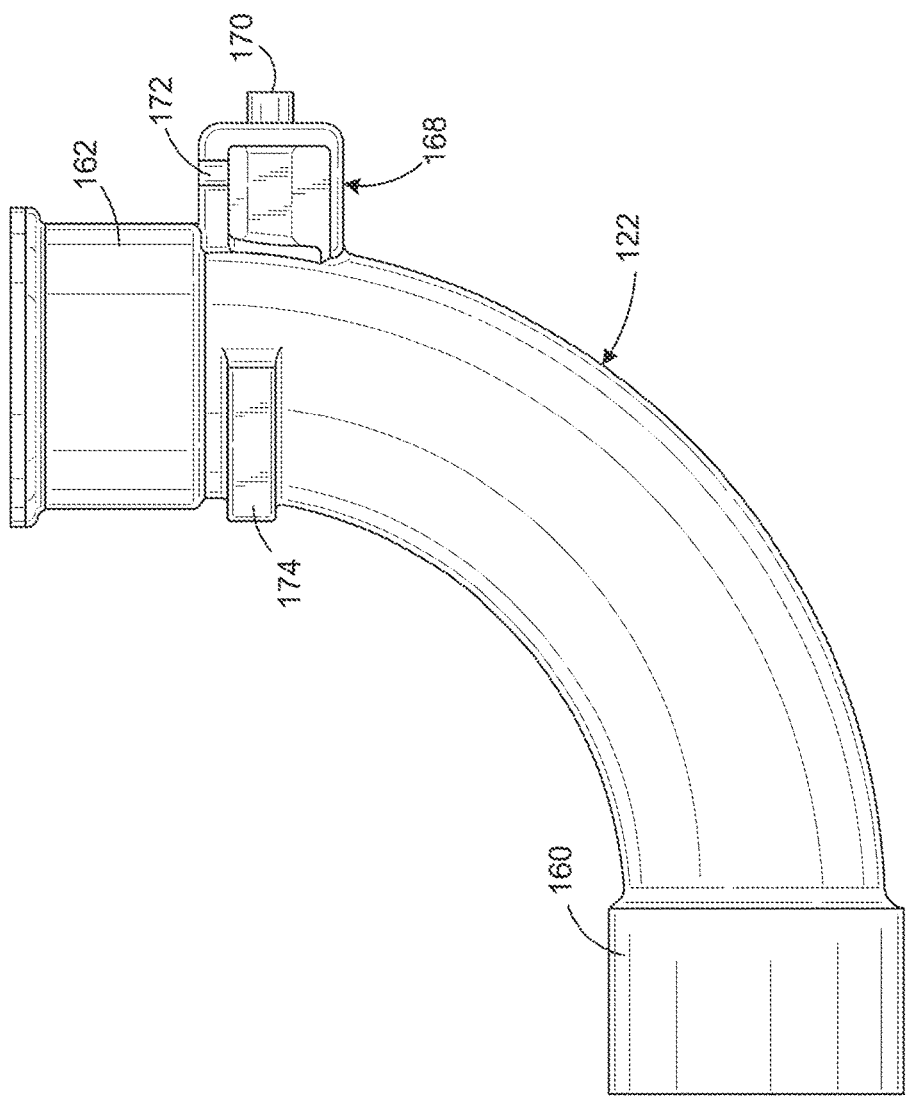
FIG. 6 is a side elevation view of the elbow of FIG. 5.

A raised ridge 74 extends partially around the elbow 22, just below the upper collar 62. The ridge 74 is continuous, except for being broken by the block 68. The elbow 22 can be mounted to the standee 24 at any select height by inserting the stub 70 into one of the openings 44 and the stabilizer 72 into corresponding notches 48 at a desired height. As is apparent viewing FIG. 4 and FIG. 1, this can be done at different levels. To support the elbow 22 during pouring, a wire 76, see FIG. 4, or the like can be used by wrapping it around the elbow 22 between the ridge 74 and the upper collar 60 and twisted to maintain desired position of the elbow 22 in the standee 24.

Referring to FIGS. 5-8, a 1-inch diameter short radius PVC elbow 122 is illustrated. The elbow 122 is generally similar to the elbow 22 discussed above. For simplicity, similar reference numerals are used except being in a 100 series. Thus, 122 in the embodiment of FIG. 5 corresponds to the embodiment 22 of FIG. 1. Therefore, not all details are repeated.

The elbow 122 is adapted to attach to the standee 24, see FIG. 1, as described above. The inner threaded wall 166 uses NPT threads. The inner diameter of the threaded inner wall 166 corresponds to a conventional RMC end diameter. A ridge 180 is provided at the top of the collar 162 to provide additional wall thickness at the top surface of the concrete slab which will be flushed therewith. As a result, the elbow 122 can be connected to a vertical above slab raceway, not shown, including a conventional 1-inch threaded connector.

The elbow 122 comprises a short radius elbow in that in the illustrated embodiment, the vertical spacing between the bottom most portion of the lower collar 160 and the top edge of the second collar 162 is 4¾-inches. This compares to about 6¾-inches in a conventional rigid metal elbow.

Although not shown, a ¾-inch short radius PVC elbow would be of generally similar construction, albeit narrow width, and with a similar 4¾-inch height to provide a short radius elbow.

Figure 11:
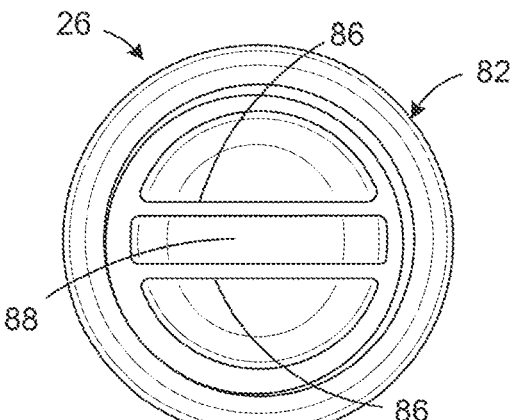
FIG. 11 is a bottom plan view of the cap of FIG. 9.
Figure 10:
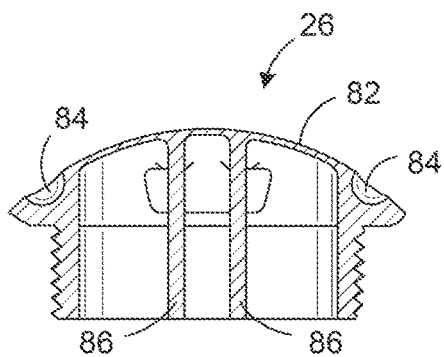
FIG. 10 is a sectional view taken along the line 10-10 of FIG. 9.
Figure 9:
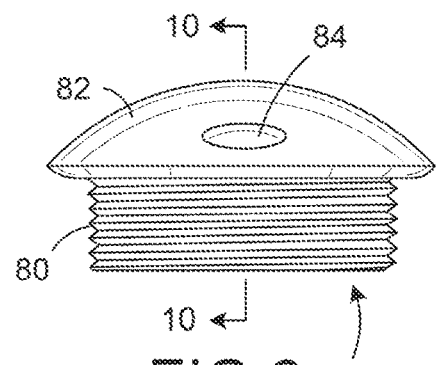
FIG. 9 is a side elevation view of a cap used with the eliminator assembly of FIG. 1.

Referring to FIGS. 9-11, the cap 26 is illustrated. The cap 26 comprises a mushroom cap. The cap 26 includes a cylindrical threaded wall 80 extending downwardly from a mushroom head 82. The mushroom head 82 includes opposite indents 84 to be used as finger holes for tightening and loosening the cap 26. The threaded neck 80 uses NPT threads and is of a size to be threadably received in the threaded upper collar 62, see FIG. 1. As is apparent, different sizes can be used according to the diameter of the pipe fitting used.

The underside of the head 82 includes opposite aligned walls 86 extending across the threaded collar 80, as shown in FIG. 11. A center portion of the head 82, labeled with 88, between the aligned walls 86, is made of a thinner wall (or a portion thereof is thinner). The diameter of the head 82 is greater than the diameter of the upper collar 62 to overlap the same to prevent concrete from entering into the elbow 22.

Usage of the conduit stub-up eliminator assembly 20 is illustrated in FIG. 12. The standee 24 is secured to formwork F using the screws 28. A horizontal in-slab raceway, indicated at R, is secured to the lower collar 60 in a conventional manner. The elbow 22 is mounted at a desired height on the standee 24 so that the top of the upper collar 62 and the top of the standee 24 are at a height corresponding to the top surface of the concrete slab. After pouring of the slab S and hardening of the same, then the cap 26 can be removed. To remove the cap 26, a tool, such as a screwdriver, spade, paddle bit or battery impact driver, or the like, can be used to break the thin top wall and then turn. The tool engages the interior walls 86, see FIG. 11, to remove the cap 26 so that it breaks free from the elbow 22. As described above, the contour of the inner surface of the cap is adapted to fit snugly within the upper opening 64 of the elbow 22 to prevent concrete or water/slurry from entering the elbow 22. Thereafter, a vertical raceway can be installed in a conventional manner as will be known to those skilled in the art.

As noted, while the described elbow is of PVC construction, it could be of metallic construction used with conventional metallic conduit. Also, the PVC could be used with other piping systems than electrical conduit. The vertical raceway which will attach to the threaded collar 62 may be of PVC or metallic construction using an appropriate adapter or fitting.

As described, the block 68 with the stub 70 and stabilizer 72 provide a means of height selection, mechanical reinforcement and limiting degrees of freedom of the elbow 22. The height adjustment is found in increments of ½-inch so that the elbow 22 can be mounted at different levels, as such as shown in FIG. 1 where the stub 70 is mounted in the fourth opening 44, rather than the top opening, see FIG. 4. Advantageously, the standee 24 includes the score lines 50, see FIG. 1, to allow the standee to be broken off a level corresponding to the top of the concrete, or slightly below. Thus, the standee 24 will be hidden under the poured concrete slab.

The hump surface of the mushroom cap 26 allows finishing of the concrete and retains the ability to locate the coupling after concrete placement and finishing. The cap 26 does so without creating a trip, fall or impalement issue. The cap 26 may advantageously be a safety orange color or the like, for visibility at locating after the concrete placement and finishing.

Also, it is possible for the cap to be formed with a flat top, or as a two-piece structure having a hump piece removably mountable to a flat cap.

Further features and advantages of the application will be readily apparent from the drawing and the description.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. Other embodiments may be within the scope of the following claims.

The invention claimed is:

1. A conduit stub-up eliminator assembly for providing a raceway connection flush with a surface of a concrete slab of a select thickness comprising:
   a pipe fitting comprising a unitary, one-piece, tubular element including a first connector end for securing to an in-slab raceway, in use, and a second connector end having a collar with an opening for selectively receiving an above slab raceway, in use, and a stub extending radially outward from the tubular element proximate the collar; and
   a supporting device comprising an elongate rail having an opening sized to receive the stub and having a length corresponding to the select thickness, and a turned in base for attachment to formwork prior to pouring of concrete to form the concrete slab,
   wherein the pipe fitting stub is received in the rail opening so that the collar opening is spaced from the base a distance corresponding to the select thickness so that the collar opening is flush with the surface of the concrete slab.

2. The conduit stub-up eliminator assembly of claim 1, wherein the pipe fitting comprises an elbow.

3. The conduit stub-up eliminator assembly of claim 2, wherein the elbow comprises a short radius elbow.

4. The conduit stub-up eliminator assembly of claim 1, wherein the collar comprises an inner thread for receiving a threaded connector.

5. The conduit stub-up eliminator assembly of claim 4, further comprising a cap threadably received in the collar to prevent concrete from entering the pipe fitting.

6. The conduit stub-up eliminator assembly of claim 5, wherein the cap comprises a mushroom head with finger receptacles on opposite sides.

7. The conduit stub-up eliminator assembly of claim 5, wherein the cap includes a pair of aligned walls extending downward from an underside of the cap for engagement by a tool head after breaking the top wall between the aligned walls.

8. The conduit stub-up eliminator assembly of claim 1, wherein the rail includes a plurality of frangible lines proximate associated ones of the openings to selectively break off the rail so that the rail is no longer than the select thickness.

9. A conduit stub-up eliminator assembly for providing a raceway connection flush with a surface of a concrete slab of a select thickness comprising:
   a pipe fitting comprising a tubular element including a first connector end for securing to an in-slab raceway, in use, and a second connector end having a collar with an opening for selectively receiving an above slab raceway, in use, and a stub extending radially outward proximate the collar; and
   a supporting device comprising an elongate rail having an opening sized to receive the stub and having a length corresponding to the select thickness, and a turned in base for attachment to formwork prior to pouring of concrete to form the concrete slab,
   wherein the pipe fitting stub is received in the rail opening so that the collar opening is spaced from the base a distance corresponding to the select thickness so that the collar opening is flush with the surface of the concrete slab, wherein the elongate rail has a U-shaped cross section to define a channel with the openings in a base of the channel and front opening notches in side walls of the rail aligned with the openings.

10. The conduit stub-up eliminator assembly of claim 9, wherein the pipe fitting comprises a rearwardly extending block having the stub and sideward extending stabilizers, the block of a size to be received in the channel with the stub in the select opening and the stabilizers received in the notches aligned with the select opening.

11. A conduit stub-up eliminator assembly for providing a raceway connection flush with a surface of a concrete slab of a select thickness comprising:
   a unitary, one-piece elbow including a first connector end for securing to a horizontal in-slab raceway, in use, and a second connector end having a threaded collar with an opening for selectively receiving a vertical above slab raceway, in use, and a stub extending radially outward from the elbow proximate the collar; and
   a supporting device comprising an elongate rail having a plurality of spaced openings sized to receive the stub and having a length corresponding to the select thickness, and a turned in base for attachment to formwork prior to pouring of concrete to form the concrete slab,
   wherein the pipe fitting stub is received in a select one of the rail openings so that the collar opening is spaced from the base a distance corresponding to the select thickness so that the collar opening is flush with the surface of the concrete slab.

12. The conduit stub-up eliminator assembly of claim 11, wherein the elbow comprises a PVC elbow.

13. The conduit stub-up eliminator assembly of claim 12, wherein the elbow comprises a short radius elbow.

14. The conduit stub-up eliminator assembly of claim 11, wherein the elbow first connector end comprises a slip fitting.

15. The conduit stub-up eliminator assembly of claim 11, further comprising a cap threadably received in the collar to prevent concrete from entering the pipe fitting.

16. The conduit stub-up eliminator assembly of claim 15, wherein the cap comprises a mushroom head with finger receptacles on opposite sides.

17. The conduit stub-up eliminator assembly of claim 15, wherein the cap includes a pair of aligned walls extending downward from an underside of the cap for engagement by a tool head after breaking the top wall between the aligned walls.

18. The conduit stub-up eliminator assembly of claim 11, wherein the rail includes a plurality of frangible lines proximate associated ones of the openings to selectively break off the rail so that the rail is no longer than the select thickness.

19. A conduit stub-up eliminator assembly for providing a raceway connection flush with a surface of a concrete slab of a select thickness comprising:

an elbow including a first connector end for securing to a horizontal in-slab raceway, in use, and a second connector end having a threaded collar with an opening for selectively receiving a vertical above slab raceway, in use, and a stub extending radially outward proximate the collar; and a supporting device comprising an elongate rail having a plurality of spaced openings sized to receive the stub and having a length corresponding to the select thickness, and a turned in base for attachment to formwork prior to pouring of concrete to form the concrete slab, wherein the pipe fitting stub is received in a select one of the rail openings so that the collar opening is spaced from the base a distance corresponding to the select thickness so that the collar opening is flush with the surface of the concrete slab, wherein the elongate rail has a U-shaped cross section to define a channel with the openings in a base of the channel and front opening notches in side walls of the rail aligned with the openings.

20. The conduit stub-up eliminator assembly of claim 19, wherein the pipe fitting comprises a rearwardly extending block having the stub and sideward extending stabilizers, the block of a size to be received in the channel with the stub in the select opening and the stabilizers received in the notches aligned with the select opening.

\* \* \* \* \*